(12) United States Patent
Takeda et al.

(10) Patent No.: US 7,718,247 B2
(45) Date of Patent: May 18, 2010

(54) SLIDING MEMBER, SLIDING MEMBER MANUFACTURING METHOD, AND COATING FOR SLIDING MEMBER

(75) Inventors: Nobuaki Takeda, Osaka (JP); Tomihiko Yanagiguchi, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 782 days.

(21) Appl. No.: 10/548,883

(22) PCT Filed: Jan. 12, 2005

(86) PCT No.: PCT/JP2005/000240

§ 371 (c)(1),
(2), (4) Date: Sep. 14, 2005

(87) PCT Pub. No.: WO2005/068861

PCT Pub. Date: Jul. 28, 2005

(65) Prior Publication Data

US 2006/0194021 A1    Aug. 31, 2006

(30) Foreign Application Priority Data

Jan. 15, 2004    (JP)    ............................ 2004-008427

(51) Int. Cl.
*D06N 7/04* (2006.01)
(52) U.S. Cl. .................... 428/141; 428/421; 428/473.5; 428/327; 264/239
(58) Field of Classification Search .................. 428/141
See application file for complete search history.

(56) References Cited

U.S. PATENT DOCUMENTS 4,358,295 A * 11/1982 Namba et al. ............... 51/309
4,507,439 A    3/1985 Stewart
4,808,455 A *  2/1989 Wada et al. ............... 428/846.2
4,842,678 A *  6/1989 Noro et al. ..................... 216/88
4,957,811 A *  9/1990 Benker et al. ............ 428/312.6
6,121,208 A    9/2000 Toyota
6,332,716 B1  12/2001 Kato et al.
2003/0059137 A1  3/2003 Kawagoe et al.
2003/0207149 A1* 11/2003 Kobayashi et al. .......... 428/672

FOREIGN PATENT DOCUMENTS

| DE | 29 13 745 A1 | 10/1980 |
| JP | 03-121135 A | 5/1991 |
| JP | 31-21135 A | 5/1991 |
| JP | 9-212967 A | 8/1997 |
| JP | 09-212967 A | 8/1997 |
| JP | 92-12967 A | 8/1997 |
| JP | 10-9270 A | 1/1998 |
| JP | 10-106215 A | 4/1998 |
| JP | 11-242822 A | 9/1999 |
| JP | 2000-143922 A | 5/2000 |
| JP | 2001-124081 A | 5/2001 |
| JP | 2002-147460 A | 5/2002 |
| WO | WO-03/006565 A1 | 1/2003 |

* cited by examiner

*Primary Examiner*—Holly Rickman
*Assistant Examiner*—Linda Chau
(74) *Attorney, Agent, or Firm*—Birch, Stewart, Kolasch & Birch, LLP

(57) ABSTRACT

A coating film (43) in which a plurality of fluoric resin particles (45) are dispersed in a matrix resin (44) is formed on the surface of a base material (41). Each exposed part (45a) of the fluoric resin particles (45) which is exposed at the surface of the coating film (43) is crushed to expand therearound to increase the area of the exposed part, increasing the amount of a fluorine element existing in a sliding face portion.

7 Claims, 4 Drawing Sheets

SLIDING MEMBER, SLIDING MEMBER MANUFACTURING METHOD, AND COATING FOR SLIDING MEMBER

TECHNICAL FIELD

The present invention relates to a sliding member, a sliding member manufacturing method, and a coating for a sliding member.

BACKGROUND ART

Fluoric resins typified by PTFE (polytetrafluoroethylene), which have low friction resistance and excellent abrasion resistance, are used for sliding members. For example, Patent Document 1 discloses that a coating obtained by adding a fluoric resin powder to a urethane resin as a binder is prepared and applied to an aluminum alloy plate for a recording medium cassette shatter to form a coating film having a coefficient of kinetic friction between 0.03 and 0.20 and a surface roughness Ra of 0.2 µm or larger.

Further, Patent Document 2 discloses that the maximum surface roughness of resin-made members that slide to each other is set in the range between 1 µm and 100 µm, both inclusive, and a fluorine-containing coating agent is applied to the sliding face of one of the members, thereby reducing the amount of abrasion at the sliding faces of both the resin-made members.

Patent Document 1: Japanese Patent Application Laid Open Publication No. 10-106215A
Patent Document 2: Japanese Patent Application Laid Open Publication No. 09-212967A

PROBLEMS THAT THE INVENTION IS TO SOLVE

In order to enhance a sliding characteristic (abrasion resistance, low friction resistance) of such a coating film containing a fluoric resin, the content of the fluoric resin is increased. However, this reduces the content of the binder resin to the contrary, inviting lowering of the strength of the coating film and liability for peeling off of the coating film from the base material. For this reason, increase in content of fluorine, namely, enhancement of the sliding characteristic is limited.

The object of the present invention is to enhance the sliding characteristic of a sliding member with less amount of a fluoric resin and to increase adhesion between a coating film and a base material.

MEANS OF SOLVING THE PROBLEMS

For tackling the aforementioned problems, the present invention has attempted to increase the amount of fluorine that contributes to the sliding characteristic of the surface of a sliding member with a limited amount of a fluoric resin.

The present invention provides a sliding member including: a surface layer portion (43),
at least the surface layer portion (43) including a matrix resin (44) in which fluoric resin particles (45) are dispersed, a surface of the surface layer portion (43) serving as a sliding face portion,
a plurality of fluoric resin particles (45) are dispersed and exposed at the sliding face portion, and each exposed part (45a) of the plurality of fluoric resin particles (45) expanding along the sliding face portion outward, compared with each remaining part thereof buried in the matrix resin (44).

In the sliding member containing the fluoric resin particles (45), the sliding characteristic thereof is enhanced as the exposed area of the fluoric resin particles (45) in its sliding face is increased. However, with the matrix resin (44) with the fluoric resin particles (45) dispersed merely, the exposed area of the fluoric resin particles (45) in the sliding face simply corresponds to the content of the fluoric resin particles (45) in the surface layer portion (43).

In contrast, in the present invention, each fluoric resin particle (45) exposed at the sliding face expands at the exposed portion (45a) thereof along the sliding face outward, compared with the remaining part thereof buried in the matrix resin (44), so that the exposed area of the fluoric resin particles (45) in the sliding face portion is increased by the expansion. Hence, an excellent sliding characteristic can be attained even with the limited content of the fluoric resin.

Wherein, the surface layer portion (43) may be formed by applying a coating on the sliding member or may be formed integrally with the sliding member itself. This point of view is applied to the inventions described below unless otherwise noted.

In another aspect of the present invention, a sliding member includes: a surface layer portion (43),
at least the surface layer portion (43) including a matrix resin (44) in which fluoric resin particles (45) are dispersed, a surface of the surface layer portion (43) serving as a sliding face portion, and
an abundance of a fluorine element in the sliding face portion is higher than an abundance of a fluorine element in the surface layer portion (43) under the sliding face portion.

The abundance of the fluorine element in the surface layer portion (43) under the sliding face corresponds to the content of the fluoric resin particles (45) in the surface layer portion (43). In the present invention, the abundance of the fluorine element in the sliding face portion is higher than the abundant thereof in the surface layer portion (43) under the sliding face portion. This means that the fluoric resin particles (45) are exposed wide at the sliding face by the increase. Hence, an excellent sliding characteristic can be attained even with the limited content of the fluoric resin.

Preferably, the abundance of the fluorine element in the sliding face portion is 1.25 times or larger than the abundance of the fluorine element in the surface layer portion (43) under the sliding face portion.

This provides advantages for obtaining an excellent sliding characteristic with less content of the fluoric resin particles.

In another aspect of the present invention, a sliding member includes:
a surface layer portion (43); and
a base material (41),
at least the surface layer portion (43) including a matrix resin (44) in which fluoric resin particles (45) are dispersed, a surface of the surface layer portion (43) serving as a sliding face portion,
the surface layer portion (43) being formed by applying a coating containing the matrix resin (44) and a fluoric resin to the base material (41),
a mass ratio between the matrix resin (44) and the fluoric resin being set within a range from "70:30" to "65:35", and
an abundance of an fluorine element in the sliding face portion being set in a range between 26 mass % and 40 mass %, both inclusive.

In short, the abundance of the fluorine element in the sliding face portion is set to be 26 mass % or larger while the ratio of the fluoric resin is restricted, in other words, increasing the amount of the matrix resin. Therefore, an excellent sliding characteristic can be attained while excellent adhesiveness of the coating film (43) to the base material (41) is ensured. Further, this enhancement of the sliding characteristic reduces the friction resistance that the coating film (43) receives upon sliding to another member, thereby further enhancing the peeling resistance.

Wherein, in order to increase the abundance of the fluorine element over 40 mass %, it is necessary to fairly reduce the amount of the matrix resin, involving difficulty in ensuring the strength of the coating film (43) and the adhesiveness of the coating film (43) to the base material (41).

Acrylic resin, alkyd resin, epoxy resin, polyamide, polyimide, polyamide-imide, or the like may be employed as the matrix resin (44) and their kinds are no object. This point of view is applied to the other inventions described below unless otherwise noted.

As the fluoric resin, fluorine-containing polymers of which main component is tetrafluoroethylene are preferable and include, for example, PTFE (tetrafluoroethylene), FEP resin (tetrafluoroethylene-hexafluoro propylene copolymer resin), PFT resin (tetrafluoroethylene-perfluoropropyl vinylether copolymer resin), and the like. This point of view is applied to the other inventions described below unless otherwise noted.

In the above, preferably, the sliding face portion has a surface roughness Ra within a range between 0.03 μm and 0.2 μm, both inclusive.

Whereby, the friction resistance of the sliding face is reduced, bringing advantages for enhancing the sliding characteristic. It is further preferable to set the surface roughness Ra within the range between 0.03 μm and 0.1 μm, both inclusive.

Another aspect of the present invention provides a sliding member manufacturing method, including the steps of:

forming a material (56) at least a surface layer portion (43) of which is made of a matrix resin (44) in which fluoric resin particles (45) are dispersed; and subjecting a surface of the surface layer portion (43) of the material (56) to lapping under pressure to set a surface roughness Ra of the surface layer portion (43) within a range between 0.03 μm and 0.2 μm, both inclusive.

Accordingly, each exposed part (45a) of the fluoric resin particles (45) exposed at the surface of the surface layer portion (43) is crushed by lapping to expand outward along the surface. This increases the abundance of the fluorine element in the surface portion of the surface layer portion (43) to be higher than the abundance of the fluorine element in the inside of the surface layer portion (43). The abundance of the fluorine element in the surface portion of the surface layer portion (43) has a correlation with the surface roughness Ra of the surface layer portion (43) which can be adjusted by the lapping. When the surface roughness Ra is set within the range between 0.03 μm and 0.2 μm, both inclusive, the abundance of the fluorine element in the surface portion of the surface layer portion (43) increases, with a result of an excellent sliding characteristic. It is further preferable to set the surface roughness Ra within the range between 0.03 μm and 0.1 μm, both inclusive.

Another aspect of the present invention provides a coating for a sliding member to be applied to a base material (41) to form a coating film (43) of which surface serves as a sliding face of a sliding member, including:

a matrix resin (44); and
a fluoric resin, a mass ratio between the matrix resin (44) and the fluoric resin being set within a range from "70:30" to "65:35", and the coating being used for a sliding member of which sliding face is subjected to lapping under pressure after the coating film (43) is formed.

When the coating for a sliding member is applied to the base material (41) and the surface of the thus formed coating film (43), that is, the sliding face is subjected to lapping under pressure, the fluoric resin particles (45) exposed at the sliding face are crushed to expand therearound along the sliding face, increasing the abundance of the fluorine element in the sliding face portion to enhance the sliding characteristic of the sliding member.

Further, the excellent sliding characteristic can be attained even with less amount of the fluoric resin in the present invention, resulting in increase in adhesiveness of the coating film (43) to the base material (41) with the amount of the matrix resin increased and resulting in reduction of friction resistance of the coating film (43) with the enhanced sliding characteristic. This brings advantages for enhancing the peeling resistance of the coating film (43).

Referring to the ratio between the matrix resin (44) and the fluoric resin, when the ratio of the matrix resin (44) becomes higher than the above range, the amount of the fluoric resin in the coating decreases though the adhesiveness of the coating film (43) to the base material (41) increases. Because there is a limit to increase the abundance of the fluorine element by lapping, it is difficult to obtain both an excellent sliding characteristic and small friction resistance. On the contrary, when the ratio of the fluoric resin is higher than the above ratio range, the adhesiveness to the base material (41) becomes insufficient with less matrix resin (44) though the sliding characteristic is enhanced. Therefore, the coating film (43) is liable to peel from the base material (41).

Preferably, the matrix resin (44) is polyamide-imide, and the fluoric resin is made of polytetrafluoroethylene and tetrafluoroethylene-hexafluoro propylene copolymer resin.

Polyamide-imide which exhibits amide bond that brings advantages in adhesion to the base material (41) and acid imide bond that brings advantages in heat resistance is employed as the matrix resin (44), so that the coating film (43) has high heat resistance, high strength, and high adhesiveness to the base material (41). Further, of fluoric resins, FEP resin having a comparatively low melting point is melted at baking of the coating film (43) to function as an adjuvant for film formation and to increase the abundance of the fluorine element in the entirety of the coating film (43). While, PTF having the high melting point remains as particles after baking of the coating film (43) and being crushed by the lapping, increasing the abundance of the fluorine element in the sliding face portion. Hence, an excellent sliding characteristic is attained.

As a solvent of the coating for a sliding member, an organic solvent such as NMP (N-methyl-2-pyrrolidone) or the like or water may be used. In a case using water as the solvent and a metal as the base material (41), it is preferable to undercoat the base material (41) with an antirust.

Further, an additive such as a pigment including carbon and the like and other materials may be blended with the coating for a sliding member. In a case of blending an additive, it is preferable to set the amount thereof small so as to avoid adverse influences on the sliding characteristic and the adhesiveness to the base material (41). For example, in a case using carbon as the additive, the amount of the fluoric resin blended is set to be 3% or lower, preferably 1% or lower, and more preferably 0.5% or lower.

EFFECTS OF THE INVENTION

According to claims 1 to 3, an excellent sliding characteristic can be attained even with limited or less amount of the fluoric resin.

According to claim 4, an excellent sliding characteristic can be attained while excellent adhesiveness of the coating film (43) to the base material (41) is ensured. In addition, this enhancement of the sliding characteristic enhances the peeling resistance of the coating film (43).

According to claim 5, the friction resistance of the sliding face becomes small, bringing advantages for enhancing the sliding characteristic.

According to claim 6, an excellent sliding characteristic can be attained even with less amount of the fluoric resin.

According to claim 7, the sliding face portion having high abundance of the fluorine element can be obtained even with less amount of the fluoric resin, and an excellent sliding characteristic can be attained while the adhesiveness of the coating film (43) to the base material (41) is enhanced. Further, the enhancement of the sliding characteristic reduces the friction resistance of the coating film (43), bringing advantages for enhancing the peeling resistance of the coating film (43).

According to claim 8, the coating film (43) can have high heat resistance, high strength, and excellent adhesiveness to the base material (41) and an excellent characteristic can be attained.

EXPLANATION OF REFERENCE NUMERALS

(17) thrust plate (sliding member)
(41) base material
(43) coating film (surface layer portion)
(44) matrix resin
(45) fluoric resin particle
(45a) exposed part
(56) material

BEST MODE FOR CARRYING OUT THE INVENTION

An embodiment of the present invention will be described below in detail with reference to the drawings.

Figure 1:
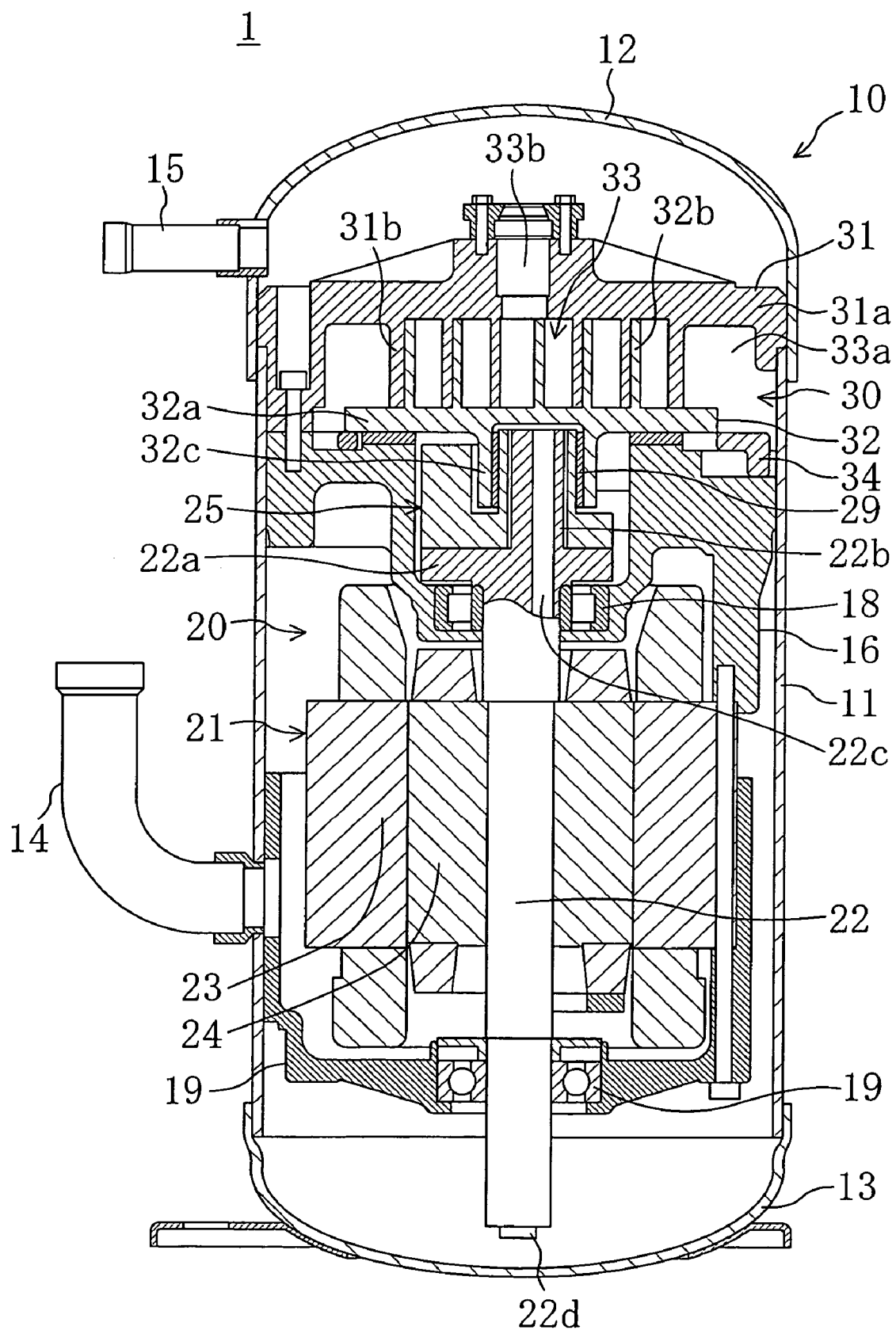
FIG. 1 is a vertical section of a scroll compressor according to Embodiment of the present invention.

In this embodiment, the present invention is applied to a thrust plate (a sliding member) of a scroll compressor (1) shown in FIG. 1.

<Scroll Compressor>

The scroll compressor (1) is used for compressing a low-pressure refrigerant sucked from an evaporator and sending it out to a condenser in a refrigeration circuit of a refrigeration apparatus that performs a vapor compression refrigeration cycle of an air conditioner, for example. This compressor (1) includes a drive mechanism (20) arranged in the lower part of a casing (10) and a compression mechanism (30) arranged in the upper part of the casing (10).

The casing (10) includes a cylindrical casing body (11), an upper head (12) fixed at the upper end of the casing body (11), and a lower head (13) fixed at the lower end of the casing body (11). Further, the casing (10) is provided with at the lower part thereof a refrigerant intake pipe (14) and at the upper part thereof a refrigerant discharge pipe (15). The intake pipe (14) and the discharge pipe (15) are connected to the evaporator and the condenser of the refrigeration circuit, respectively. In the casing (10), an upper housing (16) is fixed immediately below the compression mechanism (30) while a lower housing (19) is fixed below the drive mechanism (20).

The drive mechanism (20) is composed of a motor (21) and a drive shaft (21). The motor (21) includes an annular stator (23) fixed to the casing body (11) through the upper housing (16) and the lower housing (19) and a rotor (24) fitted to the inner peripheral face of the stator (23), the drive shaft (22) being connected to the rotor (24). This drive shaft (22) is rotatably supported by a ball bearing (18) of the upper housing (16) and a ball bearing (19a) of the lower housing (19).

In the drive shaft (22), a main oil supply path (22c) extending in the axial direction thereof is formed. An oil supply pump (22d) is provided at the lower end of the drive shaft (22) so as to pump up refrigerator oil reserved in an oil stop at the bottom of the casing (10) in association with the rotation of the drive shaft (22). The main oil supply path (22c) communicates with an oil supply port (not shown) provided at each part so as to supply the refrigerator oil pumped up by the oil supply pump to each sliding part.

The compression mechanism (30) includes a fixed scroll (31) fixed to the upper housing (16) and a moveable scroll (32) rotatably supported on the upper surface of the upper hosing (16) through the thrust plate (17) and set movable with respect to the fixed scroll (31). The fixed scroll (31) includes a fixed-side head (31a) fixed to the upper housing (16) by means of joint means such as a bolt and a spiral (involute) lap (31b) integrally formed with the fixed-side head (31a). The movable scroll (32) includes a movable-side head (32a) and a spiral (involute) lap (32b) integrally formed with the movable-side head (32a). The lap (31b) of the fixed scroll (31) and the lap (32b) of the moveable scroll (32) mesh with each other. The space in which the laps (31b, 32b) contact with each other between the fixed-side head (31a) and the movable-side head (32a) serves as a compression chamber (33).

An inlet port (33a) is formed in the outer peripheral part of the compression chamber (33) so as to communicate with the intake pipe (14) via a space (low-pressure space) below the compression mechanism (30) in the casing (10). Also, a discharge port (33b) is formed in the central part of the compression chamber (33) so as to communicate with the discharge pipe (15) via a space (high-pressure space) above the compression mechanism (30) in the casing (10).

At the upper end of the drive shaft (22), there are formed a bearing portion (22a) extending radially outward and an eccentric portion (22b) eccentric to the center of rotation of the drive shaft (22) at a dimension corresponding to the optimum orbital radius of the revolution of the moveable scroll (32). On the other hand, at the lower surface of the movable-side head (32a) of the movable scroll (32), a cylindrical bearing portion (a fitting portion) (32c) is formed so as to be coaxial with the eccentric portion (22b). This bearing portion (32c) has an inner diameter larger than the outer diameter of the eccentric portion (22b).

The eccentric portion (22b) and the bearing portion (32c) are connected with each other by means of a slide bush (25). Also, a sleeve bearing (29) is fitted between the slide bush (25) and the bearing portion (32c). An Oldham coupling (34) is provided between the movable scroll (32) and the upper housing (16) to serve as a mechanism for inhibiting rotation of the movable scroll (32).

With the above arrangement, when the motor (21) is operated, the drive shaft (22) rotates in association with the rotation of the rotor (24), so that the rotational force is transmitted to the movable scroll (32) through the slide bush (25). The movable scroll (32), which is inhibited from rotation by the Oldham coupling (34), only revolves around the center of rotation of the drive shaft (22) without rotation. By the operation of the revolution of the movable scroll (32), the compression chamber (33) between the fixed scroll (31) and the movable scroll (32) is changed in volume. In association with the change in volume thereof, the low-pressure refrigerant is sucked from the intake pipe (14) and is compressed in the compression chamber (33), so that the pressure of the refrigerant becomes high. After the high-pressure refrigerant is discharged from the discharge pipe (15), the refrigerant is subjected to processes of condensation, expansion, and evaporation and is sucked into the intake pipe (14) again to be compressed. This operation is repeated.

Usually, the bearing face of the thrust plate (17) of the compressor (1) is lubricated by the refrigerator oil supplied through the main oil supply path (22c). However, the compressor (1) may be operated in the following strict conditions, and in turn, in the condition that no refrigerator oil exists on the bearing face.

A. The compressor (1) is operated in the condition that the refrigerator oil in the oil stop is exhausted.
B. The compressor (1) is started to operate after the refrigerant returns to the compressor (1) from the high pressure side of the refrigeration circuit in operation stop of the compressor (1) and the bearing face is washed by the liquid refrigerant
C. The operation continues in the condition that the liquid refrigerant returns excessively to dilute the refrigerator oil in the oil stop in the operation of the compressor (1) and the bearing face is washed by the liquid refrigerant of the refrigerator oil.

Under the circumstances, in the present embodiment, the thrust plate (17) is arranged as follows to improve the sliding characteristic thereof so that abnormal abrasion and sticking of the movable scroll (32) and/or the upper housing (16) are prevented even if the compressor (1) is operated with no refrigerator oil on the bearing face.

<Structure of Thrust Plate>

Figure 2:
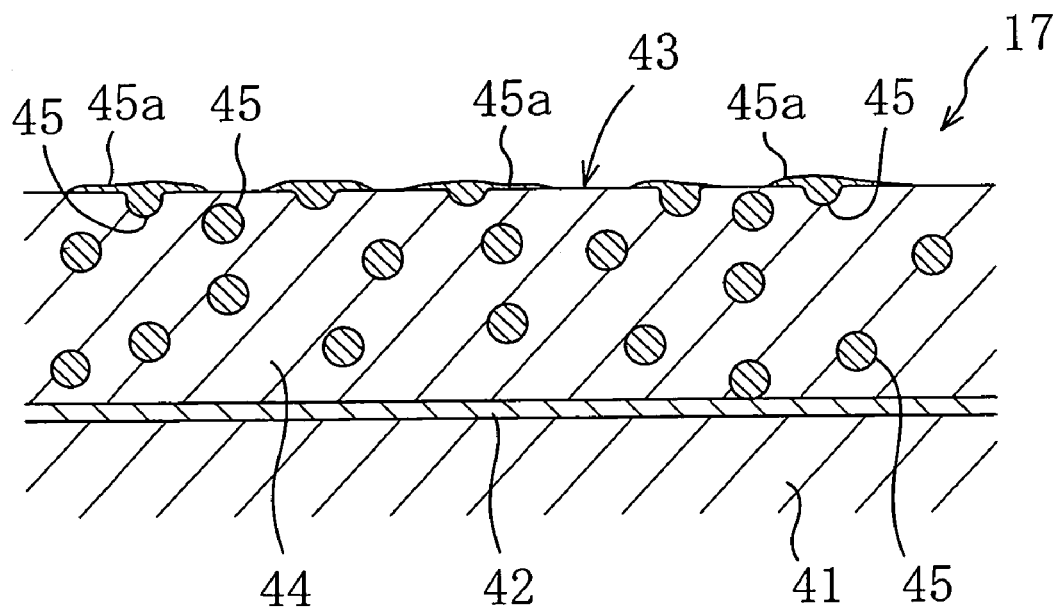
FIG. 2 is a section schematically showing a part of a thrust plate used in the compressor.

The thrust plate (17) is formed, as schematically shown in FIG. 2, in such a fashion that a zinc phosphate film (42) is formed on the surface of a base material (41) of a steel plate and a coating film (surface layer portion) (43) is formed on the surface of the zinc phosphate film (42), the surface of the coating film serving as a sliding face.

In the coating film (43), fluoric resin particles (45) are dispersed in a matrix resin (44). Also, a plurality of fluoric resin particles (45) are dispersed and exposed at the sliding face (the surface) of the coating film (43) and each exposed part (45a) of the fluoric resin particles (45) at the sliding face is crashed so as to expand along the sliding face outward, compared with the remaining part thereof buried in the matrix resin (44). The expansion of each crushed exposed part (45a) of the fluoric resin particles (45) increases the abundance of the fluorine element in the sliding face portion higher than the abundance of the fluorine element in the inside of the coating film (43) under the sliding face.

It is note that, though not shown, the fluoric resin melt in baking of the coating film (43) is dispersed in the matrix resin (44) and the fluorine element of the melted and dispersed fluoric resin contributes to the abundance of the fluorine element.

The matrix resin (44) is polyamide-imide serving as a binder, the fluoric resin particles (45) remaining as particles after formation of the coating film (43) is PTFE, and the fluoric resin melted in baking of the coating film (43) and dispersed in the matrix resin (44) is FEP resin.

<Thrust Plate Manufacturing Method>

An example of thrust plate manufacturing methods will be described next. Wherein, the present invention is not limited to this example.

—Formation of Material—

First, the base material (41) having a surface roughness Ra of about 0.1 μm is treated with an aqueous solution of zinc phosphate to form the zinc phosphate film (42) on the surface of the base material (41). Then, a coating having the following composition is applied on the surface of the zinc phosphate film (42) and is baked to form the coating film (43).

(Composition of Coating)

Polyamide-imide; 70 weight part

PTFE (380° C. melting point); 3 weight part

FEP resin (260° C. melting point); 27 weight part

Graphite; 0.15 weight part

Solvent; NMP (proper amount)

The temperature for baking the coating film (43) is 280° C., which is lower than the melting point of the FEP resin powder (2 μm or smaller grain diameter), and accordingly, the FEP resin is melted in the baking so as to contribute to formation of the coating film (43). Because the PTFE powder (2 μm or smaller grain diameter) has a melting point higher than the temperature for baking, it remains as the fluoric resin particles (45) and dispersed in the coating film. The thickness of the coating film after baking is set to be, for example, about 40 to 70 μm. Also, the surface roughness Ra of the coating film (43) is about 0.3 to 0.6 μm.

—Treatment to Material—

Figure 3:
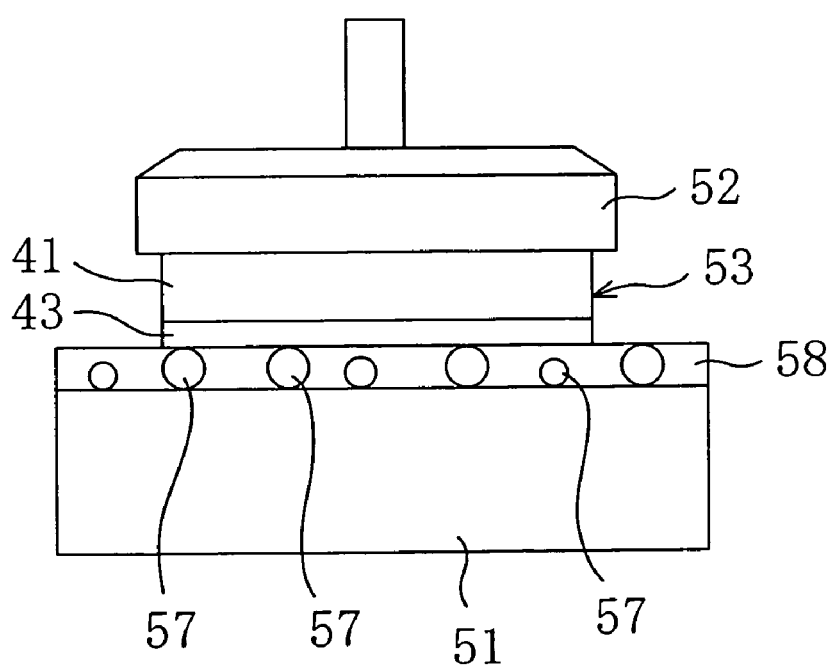
FIG. 3 is a view schematically showing a state in which the thrust plate is subjected to lapping.

Next, the surface of the coating film (43) of the thus obtained material is subjected to lapping. FIG. 3 shows schematically the state where lapping is performed. In the drawing, the reference numeral (51) denotes a lapping surface plate and (52) denotes a pressure plate. The surface of the coating film (43) is lapped in such a state that the material (56) is fixed to the pressure plate (52) and an abrasive liquid (58) in which free abrasive grain (57) is dispersed is allowed to intervene between the lapping surface plate (51) and the coating film (43) of the material (56). The lapping pressure is set in the range between 9.8 kPa and 49 kPa, both inclusive, and preferably, in the range between 9.8 kPa and 19.6 kPa, both inclusive.

Figure 4:
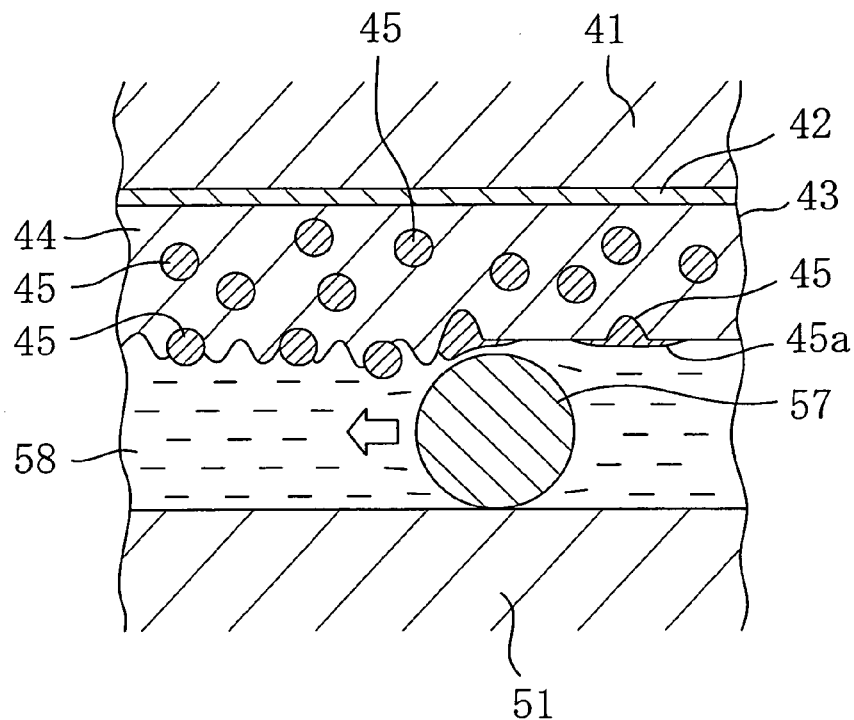
FIG. 4 is a section schematically showing a state in which fluoric resin particles at a sliding face are crushed by the lapping.

This lapping with the abrasive grain (57) crushes each exposed part (45a) of the fluoric resin particles (45) which is exposed at the surface of the coating film (43) so that each exposed part (45a) expands outward along the surface of the coating film (43), as shown in FIG. 4, compared with the part thereof buried in the coating film (43). By doing so, the coating film (43) has a film thickness of about 30 μm and the surface roughness Ra thereof becomes small. It is preferable to set the surface roughness Ra within the range between 0.03 μm and 0.2 μm, both inclusive.

—Relationship between Surface Roughness Ra and Abundance of Fluorine Element in Surface Portion of Coating Film—

Figure 5:
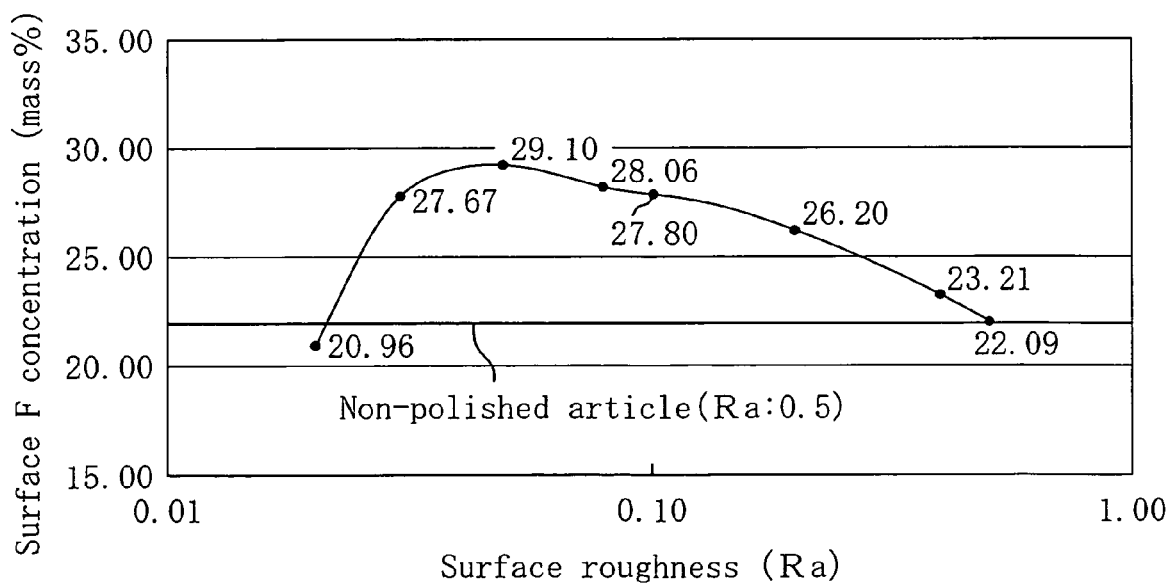
FIG. 5 is a graph indicting the relationship between surface roughness and surface F concentration of a sliding face portion.

FIG. 5 is a graph (the lateral axis is on the logarithmic scale) showing the relationship between surface roughness Ra and surface F concentration (abundance of a fluorine element) when the lapping is performed with the grain size of the abrasive grain (57) changed variously, wherein the above coating composition is employed (matrix resin (polyamide-imide): fluoric resin (PTFE+FEP resin)=70:30). The surface F concentration was measured using an EDX (an energy-dispersive X-ray fluorescence diffraction device). The non-polished article is an article before being subjected to lapping and has a surface roughness Ra of 0.5 μm and a surface F concentration of 22 mass %. The surface roughness Ra and the surface F concentration are as indicated in Table 1.

TABLE 1

| Surface roughness Ra (μm) | Surface F concentration (mass %) |
|---|---|
| 0.5 | 22.09 |
| 0.4 | 23.21 |
| 0.2 | 26.20 |
| 0.1 | 27.80 |
| 0.08 | 28.06 |
| 0.05 | 29.10 |
| 0.03 | 27.67 |
| 0.02 | 20.69 |

FIG. 5 and Table 1 prove that when the lapping attains the surface roughness Ra in the range between 0.03 μm and 0.5 μm, both inclusive, the surface F concentration becomes higher than that of the non-polished article, resulting in excellent sliding characteristic of the thrust plate (17). This is because each exposed part (45a) of the fluoric resin particles (45) which is exposed at the surface of the coating film (43) is crushed by lapping to expand therearound.

Figure 6:
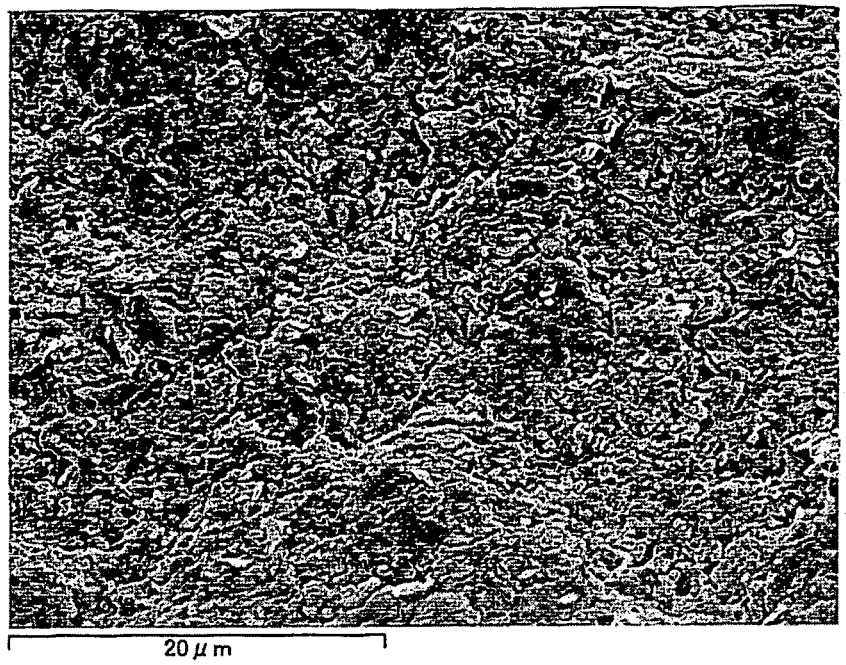
FIG. 6 is a photomicrograph obtained by shooting a sliding face of a non-polished article.
Figure 7:
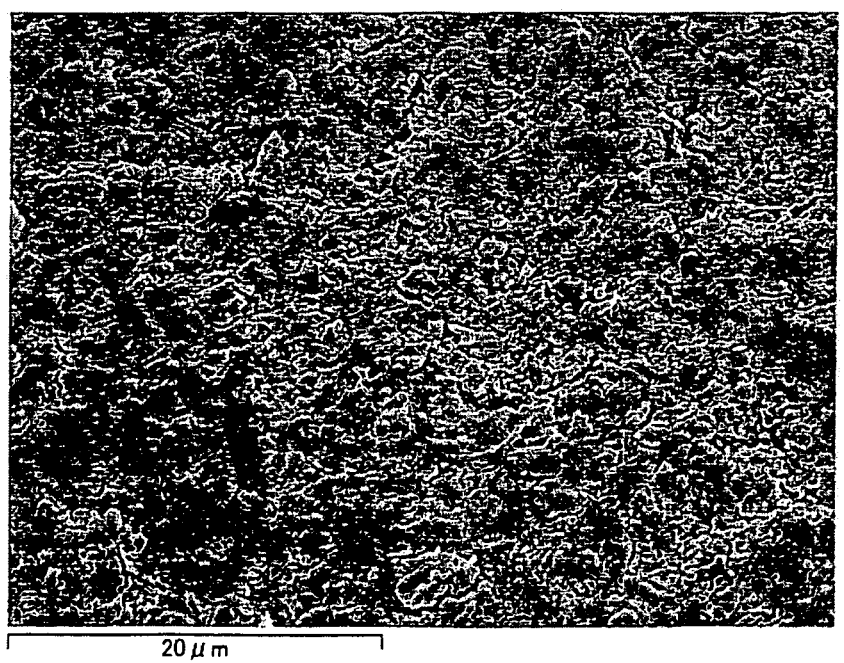
FIG. 7 is a photomicrograph obtained by shooting a sliding face of an article that has been subjected to lapping.

FIG. 6 is a photo of the surface of the non-polished article and FIG. 7 is a photo of the surface of the coating film of the thrust plate (17) according to the present invention which has been subjected to lapping so as to have a surface roughness Ra of 0.05 μm. FIG. 6 shows small roughness of concave and convex parts in the surface portion of the coating film. While, it is understood from FIG. 7 that the convex parts at the surface of the coating film are crushed to expand therearound and the fluoric resin particles are also crushed to increase in area of the exposed parts thereof.

Referring to FIG. 5 and Table 1, the surface F concentration has a peak at around the surface roughness Ra of 0.05 μm and decreases when the surface roughness Ra is increases and decreases. When the surface roughness Ra is large, the surface F concentration is not so high because the exposed parts (45a) of the fluoric resin particles (45) are crushed by lapping insufficiently. On the other hand, the surface F concentration decreases as the surface roughness Ra is decreased. Because, the grain diameter of the abrasive grain (57) must be small for reducing the surface roughness Ra and the fluoric resin particles (45) at the surface of the coating film are shoved away by the abrasive grain (57) of small size.

According to the above results, it is understood that lapping to attain the surface roughness Ra within the predetermined range is effective for increasing the surface F concentration. When the surface F concentration of the polished article is 1.25 times or larger than that of the non-polished article, the sliding characteristic is improved remarkably. For setting the surface F concentration to be 1.25 times or larger, it is preferable to set the surface roughness Ra within the range between 0.03 μm and 0.2 μm, both inclusive.

The grain diameter of the abrasive grain (57) influences the surface roughness Ra resulted from the lapping, and the surface roughness Ra are 0.03 μm, 0.05 μm, 0.1 μm, and 0.5 μm when the grain diameters are 4 μm, 8 μm, 12 μm, and 20 μm, respectively, in general. Accordingly, it is preferable to set the grain diameter of the abrasive grain (57) within the range between 3 μm and 25 μm, both inclusive, and more preferably, within the range between 4 μm and 12 μm, both inclusive.

—Abundance of Fluorine Element in Sliding Face Portion (Surface Portion of Coating Film)—

As described above, in the present invention, the surface F concentration is increased higher than that of the non-polished article by subjecting the surface of the coating film to lapping. Wherein, the surface F concentration of the non-polished article corresponds to the abundance of the fluorine element in the coating film under the sliding face, that is, the inside of the coating film. The abundance of the fluorine element therein under the sliding face can be measured in such a manner that the sliding face is polished to expose the inside of the coating film and the elements existing in the exposed surface portion is analyzed using an EDX. The inside of the coating film under the sliding face can be exposed by lapping the sliding face under the conditions of 20 μm grain diameter of the abrasive grain, 9.8 kPa lapping pressure, 1 m/sec polishing speed, and 30 sec polishing time period.

In this way, the surface F concentration of the sliding face portion of the sliding member is measured using an EDX, the inside of the coating film is exposed by lapping the sliding face under the above conditions, and then, the surface F concentration of the exposed surface portion is measured. When the surface F concentration of the former is higher than that of the latter, it can be confirmed that the present invention is effective.

—Others—

It is noted that the thrust plate (17) is provided in the above embodiment. Instead, the coating film (43) having an excellent sliding characteristic may be formed directly on the upper housing (16) by the same manner as in the above embodiment.

Further, the surface F concentration of the sliding face portion may be increased by varnishing rather than lapping.

INDUSTRIAL APPLICABILITY

As described above, the present invention is useful for sliding members of compressors and the like.

The invention claimed is:

1. A sliding member, comprising:
a surface layer portion,
the surface layer portion including a matrix resin in which fluoric resin particles are dispersed, a surface of the surface layer portion serving as a sliding face portion,
wherein a plurality of the fluoric resin particles are dispersed and exposed at the sliding face portion,
and each exposed part of the plurality of fluoric resin particles is subjected to lapping under pressure by utilizing a pressure plate to crush each exposed part so that each exposed part is deliberately expanded along the sliding face portion outward, compared with each remaining part thereof buried in the matrix resin, wherein an abundance of a fluorine element in said sliding face portion is 25% greater than an abundance of a fluorine element in the surface layer portion under said sliding face portion.

2. A sliding member, comprising:

a surface layer portion; and a base material;

the surface layer portion including a matrix resin in which fluoric resin particles are dispersed, a surface of the surface layer portion serving as a sliding face portion, the surface layer portion being formed by applying a coating containing the matrix resin and a fluoric resin to the base material, a mass ratio between the matrix resin and the fluoric resin being set within a range from "70:30" to "65:35", and an abundance of a fluorine element in the sliding face portion being set in a range between 26 mass % and 40 mass %, both inclusive, wherein a plurality of the fluoric resin particles are dispersed and exposed at the sliding face portion, and each exposed part at the sliding face portion is subjected to lapping under pressure by utilizing a pressure plate to crush each exposed part so that each exposed part is deliberately expanded outward, compared with each remaining part thereof buried in the matrix resin, wherein an abundance of the fluorine element in said sliding face portion is 25% greater than an abundance of the fluorine element in the surface layer portion under said sliding face portion.

3. The sliding member of claim 1 or 2, wherein the sliding face portion has a surface roughness Ra within a range between 0.03 μm and 0.2 μm, both inclusive.

4. The sliding member of claim 1, wherein each exposed part of the plurality of fluoric resin particles is substantially flat and each remaining part thereof buried in the matrix resin has an arcuate shape.

5. The sliding member of claim 2, wherein each exposed part of the plurality of fluoric resin particles is substantially flat and each remaining part thereof buried in the matrix resin has an arcuate shape.

6. A sliding member manufacturing method, comprising the steps of:

forming a material at least a surface layer portion of which is made of a matrix resin in which fluoric resin particles are dispersed, wherein a plurality of the fluoric resin particles are dispersed and exposed at a surface of the surface layer portion; and subjecting the surface of the surface layer portion of the material to lapping under pressure to crush each exposed part of the plurality of fluoric resin particles so that each exposed part is deliberately expanded outward, compared with each remaining part thereof buried in the matrix resin and to set a surface roughness Ra of the surface layer portion within a range between 0.03 μm and 0.2 μm, both inclusive, wherein an abundance of a fluorine element in said sliding face portion is 25% greater than an abundance of a fluorine element in the surface layer portion under said sliding face portion.

7. The sliding member manufacturing method according to claim 6, wherein each exposed part of the plurality of fluoric resin particles is substantially flat and each remaining part thereof buried in the matrix resin has an arcuate shape.

* * * * *